United States Patent
Fleming et al.

(10) Patent No.: US 10,864,934 B2
(45) Date of Patent: Dec. 15, 2020

(54) PASSENGER TRANSPORT CARRIERS

(71) Applicant: Thule Canada Inc., Granby (CA)

(72) Inventors: Wesley Fleming, Calgary (CA); Daniel Britton, Calgary (CA)

(73) Assignee: Thule Canada Inc., Granby (CA)

( * ) Notice: Subject to any disclaimer, the term of this patent is extended or adjusted under 35 U.S.C. 154(b) by 10 days.

(21) Appl. No.: 15/874,658

(22) Filed: Jan. 18, 2018

(65) Prior Publication Data

US 2018/0141579 A1 May 24, 2018

Related U.S. Application Data

(63) Continuation of application No. 15/169,213, filed on May 31, 2016, now Pat. No. 9,908,552.

(51) Int. Cl.
*B62B 1/00* (2006.01)
*B62B 7/10* (2006.01)
(Continued)

(52) U.S. Cl.
CPC ............... *B62B 7/10* (2013.01); *B62B 7/126* (2013.01); *B62K 27/02* (2013.01);
(Continued)

(58) Field of Classification Search
CPC .. B62B 7/10; B62B 7/126; B62B 7/12; B62B 7/044; B62B 7/046; B62B 7/06;
(Continued)

(56) References Cited

U.S. PATENT DOCUMENTS 5,474,316 A 12/1995 Britton
5,562,330 A 10/1996 Cabagnero
(Continued)

FOREIGN PATENT DOCUMENTS

CN 14 13865 4/2003
DE 10 2011 110 917 2/2013

OTHER PUBLICATIONS

English abstract for publication No. CN 1413865, published on Apr. 30, 2003.
(Continued)

*Primary Examiner* — James M Dolak
(74) *Attorney, Agent, or Firm* — Sterne, Kessler, Goldstein & Fox P.L.L.C.

(57) ABSTRACT

A child transport carrier includes an upper frame member having a forward end and a rear end and a rear frame coupled to the upper frame member. The rear frame includes a lower rear frame member, an upper rear frame member having an upper end fixedly coupled to the rear end of the upper frame member, and a first joint assembly coupling the lower rear frame member and the upper rear frame member. The rear frame is configured to fold between an unfolded in-use position and a folded storage position. The upper frame member and the upper rear frame member are fixed relative to each other. The first joint assembly is disposed longitudinally rearward of the forward end of the upper frame member and longitudinally forward of the rear end of the upper frame member in the unfolded in-use position.

19 Claims, 8 Drawing Sheets

(51) Int. Cl.
*B62B 7/12* (2006.01)
*B62K 27/02* (2006.01)
*B62K 27/00* (2006.01)

(52) U.S. Cl.
CPC ..... *B62B 2205/104* (2013.01); *B62B 2205/12* (2013.01); *B62K 27/00* (2013.01)

(58) Field of Classification Search
CPC ........... B62B 5/0079; B62B 3/02; B62B 3/12; B62B 3/022; B62B 2205/10; B62B 2205/104; B62B 2205/02; B62B 2205/14; B62B 2205/04; B62K 27/003; B62K 27/02; B62K 27/00; B62K 27/04
See application file for complete search history.

(56) References Cited

U.S. PATENT DOCUMENTS

| | | | |
|---|---|---|---|
| 5,577,746 A | 11/1996 | Britton | |
| 5,695,208 A | 12/1997 | Baechler et al. | |
| 5,785,333 A | 7/1998 | Hinkston et al. | |
| 5,829,771 A | 11/1998 | Hsu | |
| 5,979,921 A | 11/1999 | Derven et al. | |
| 5,984,332 A | 11/1999 | Beaudoin et al. | |
| 6,705,628 B2 | 3/2004 | Kahmann | |
| 6,991,249 B2 | 1/2006 | Shapiro | |
| 7,168,761 B2 | 1/2007 | Britton et al. | |
| 7,341,265 B1 | 3/2008 | Liu | |
| 7,354,058 B2 | 4/2008 | Chou | |
| 7,387,310 B1 | 6/2008 | Liu | |
| 7,547,029 B2 | 6/2009 | Britton et al. | |
| 7,766,359 B2 * | 8/2010 | Klevana | B62K 27/12 280/204 |
| 8,172,254 B2 * | 5/2012 | Park | B62B 5/065 280/47.38 |
| 8,444,173 B1 | 5/2013 | Liu | |
| 8,544,873 B2 | 10/2013 | Chen | |
| 8,936,269 B1 * | 1/2015 | Liu | B62K 27/003 280/204 |
| 9,044,104 B2 | 6/2015 | Smith | |
| 9,561,817 B2 | 2/2017 | Laffan et al. | |
| 9,751,585 B1 | 9/2017 | Liu | |
| 9,796,404 B2 | 10/2017 | Xu | |
| 10,106,186 B2 * | 10/2018 | Choi | B29C 35/02 |
| 10,322,740 B2 * | 6/2019 | Chen | B62B 7/10 |
| 10,377,406 B2 * | 8/2019 | Baek | B62B 7/105 |
| 10,442,452 B2 * | 10/2019 | Fleming | B62B 7/126 |
| 10,562,556 B1 * | 2/2020 | Horowitz | B62B 3/025 |
| 10,597,058 B2 * | 3/2020 | Bowman | B62B 5/082 |
| 10,710,624 B1 * | 7/2020 | Yaeger | B62B 9/005 |
| 2002/0096857 A1 | 7/2002 | Valdez et al. | |
| 2006/0273555 A1 | 12/2006 | Morgan, Jr. et al. | |
| 2007/0284842 A1 | 12/2007 | O'Donnell | |
| 2008/0143076 A1 | 6/2008 | Klevana et al. | |
| 2010/0244405 A1 | 9/2010 | Assaf | |

OTHER PUBLICATIONS

English abstract for publication No. DE 10 201 1110917, published on Feb. 21, 2013.

* cited by examiner

PASSENGER TRANSPORT CARRIERS

CROSS-REFERENCE TO RELATED APPLICATION

This application claims priority to U.S. application Ser. No. 15/169,213, filed May 31, 2016, which is hereby incorporated herein in its entirety by reference.

BACKGROUND

Field

The present disclosure relates to passenger transport carriers. More specifically, embodiments of the present disclosure relate to passenger transport carriers having a foldable frame.

Background

Passenger transport carriers carry a passenger, for example, a child, from one place to another. The transport carrier can be foldable between an expanded in-use position that facilitates normal operation of the carrier and a compact storage position that facilitates easy storage and manual hauling of the carrier.

BRIEF SUMMARY

In some embodiments, a passenger transport carrier, for example, a child transport carrier, can include a lower frame member having a forward end and a rear end, an upper frame member having a forward end and a rear end, and a rear frame coupling the lower frame member to the upper frame member. In some embodiments, the rear frame can include a lower rear frame member having a lower end coupled to the rear end of the lower frame member and an upper rear frame member having an upper end coupled to the rear end of the upper frame member. In some embodiments, a first joint assembly can couple the lower rear frame member and the upper rear frame member. In some embodiments, the rear frame can be configured to fold between an unfolded in-use position and a folded storage position. In some embodiments, an exterior angle formed by the lower rear frame member and the upper rear frame member can be less than 180 degrees in the unfolded in-use position. In some embodiments, the exterior angle formed by the lower rear frame member and the upper rear frame member can be less than 175 degrees. In some embodiments, the exterior angle formed by the lower rear frame member and the upper rear frame member can be less than 165 degrees.

In some embodiments, the lower rear frame member and the upper rear frame member can be prevented from pivoting with respect to each other when the carrier is in the unfolded in-use position. In some embodiments, the first joint assembly can be disposed longitudinally forward of the rear end of the upper frame member in the unfolded in-use position. In some embodiments, the first joint assembly can be disposed longitudinally rearward of the forward end of the upper frame member in the unfolded in-use position. In some embodiments, the first joint assembly can be disposed longitudinally rearward of the rear end of the lower frame member in the unfolded in-use position.

In some embodiments, the first joint assembly can disposed longitudinally forward of the forward end of the upper frame member in the folded storage position. In some embodiments, the first joint assembly can be configured to move toward the forward end of the lower frame member when transitioning from the unfolded in-use position to the folded storage position.

In some embodiments, an interior angle between the upper frame member and the upper rear frame member can be fixed. In some embodiments, an interior angle between the upper frame member and the upper rear frame member can be less than 90 degrees. In some embodiments, an interior angle between the upper frame member and the upper rear frame member can be less than 80 degrees. In some embodiments, an interior angle between the upper frame member and the upper rear frame member can be less than 70 degrees.

In some embodiments, the carrier can include a forward frame member having a lower end and an upper end. In some embodiments, a second joint assembly can rotatably couple the upper end of the forward member and the forward end of the upper frame member. In some embodiments, the second joint assembly can be a non-locking joint. In some embodiments, an interior angle between the forward frame member and the upper frame member can be fixed when the carrier is in the unfolded in-use position. In some embodiments, the interior angle between the forward frame member and the upper frame member can be greater than 90 degrees when the carrier is in the unfolded in-use position. In some embodiments, the interior angle between the forward frame member and the upper frame member can be approximately 90 degrees when the carrier is in the folded storage position.

In some embodiments, the upper frame member can be configured to pivot about the second joint assembly when the carrier is transitioning from the unfolded in-use position to the folded storage position. In some embodiments, the upper frame member can be configured to pivot about the second joint assembly and configured to move toward the forward end of the lower frame member when transitioning from the unfolded in-use position to the folded storage position.

In some embodiments, a child transport carrier can include an upper frame member having a forward end and a rear end and a rear frame coupled to the upper frame member. In some embodiments, the rear frame can include a lower rear frame member, an upper rear frame member having an upper end fixedly coupled to the rear end of the upper frame member, and a first joint assembly coupling the lower rear frame member and the upper rear frame member. In some embodiments, the rear frame can be configured to fold between an unfolded in-use position and a folded storage position. In some embodiments, the upper frame member and the upper rear frame member can be fixed relative to each other. In some embodiments, the first joint assembly can be disposed longitudinally rearward of the forward end of the upper frame member and longitudinally forward of the rear end of the upper frame member in the unfolded in-use position.

In some embodiments, the carrier can include a lower frame member having a forward end and a rear end. In some embodiments, the rear end of the lower frame member can be coupled to a lower end of the lower rear frame member. In some embodiments, the first joint assembly can be disposed longitudinally rearward of the lower end of the lower rear frame member in the unfolded in-use position. In some embodiments, the first joint assembly can be configured to move toward the forward end of the lower frame member when transitioning from the unfolded in-use position to the folded storage position, such that the first joint assembly is disposed longitudinally forward of the forward end of the upper frame member in the folded storage position.

In some embodiments, a child transport carrier can include an upper frame member having a rear end and a rear frame comprising an upper rear frame member having an upper end coupled to the rear end of the upper frame member. In some embodiments, the upper frame member and the upper rear frame member can be fixed relative to each other. In some embodiments, the upper frame member and the upper rear frame member can form an acute interior angle. In some embodiments, the rear frame can be configured to fold between an unfolded in-use position and a folded storage position.

In some embodiments, the rear frame can include a lower rear frame member having an upper end coupled to a lower end of the upper rear frame member. In some embodiments, the upper rear frame member and the lower rear frame member can form an obtuse exterior angle in the unfolded in-use position. In some embodiments, the upper rear frame member and the lower rear frame member can faun an acute exterior angle in the folded storage position.

In some embodiments, a method of folding a child transport carrier can include unlocking a first joint assembly coupling a lower rear frame member and an upper rear frame member. In some embodiments, the first joint assembly can be disposed longitudinally forward of a rear end of an upper frame member, longitudinally rearward of a forward end of the upper frame member, and longitudinally rearward of a lower end of the lower rear frame member in an unfolded in-use position. In some embodiments, the method can include rotating the upper frame member and the upper rear frame member about a second joint assembly comprising an upper end of a forward frame member. In some embodiments, the upper frame member can be fixedly coupled to the upper rear frame member. In some embodiments, the method can include displacing the first joint assembly longitudinally forward such that the first joint assembly is disposed longitudinally forward of the forward end of the upper frame member in a folded storage position.

BRIEF DESCRIPTION OF THE DRAWINGS

The accompanying drawings, which are incorporated herein and form a part of the specification, illustrate the embodiments and, together with the description, further serve to explain the principles of the embodiments and to enable a person skilled in the relevant art(s) to make and use the embodiments.

Figure 1:
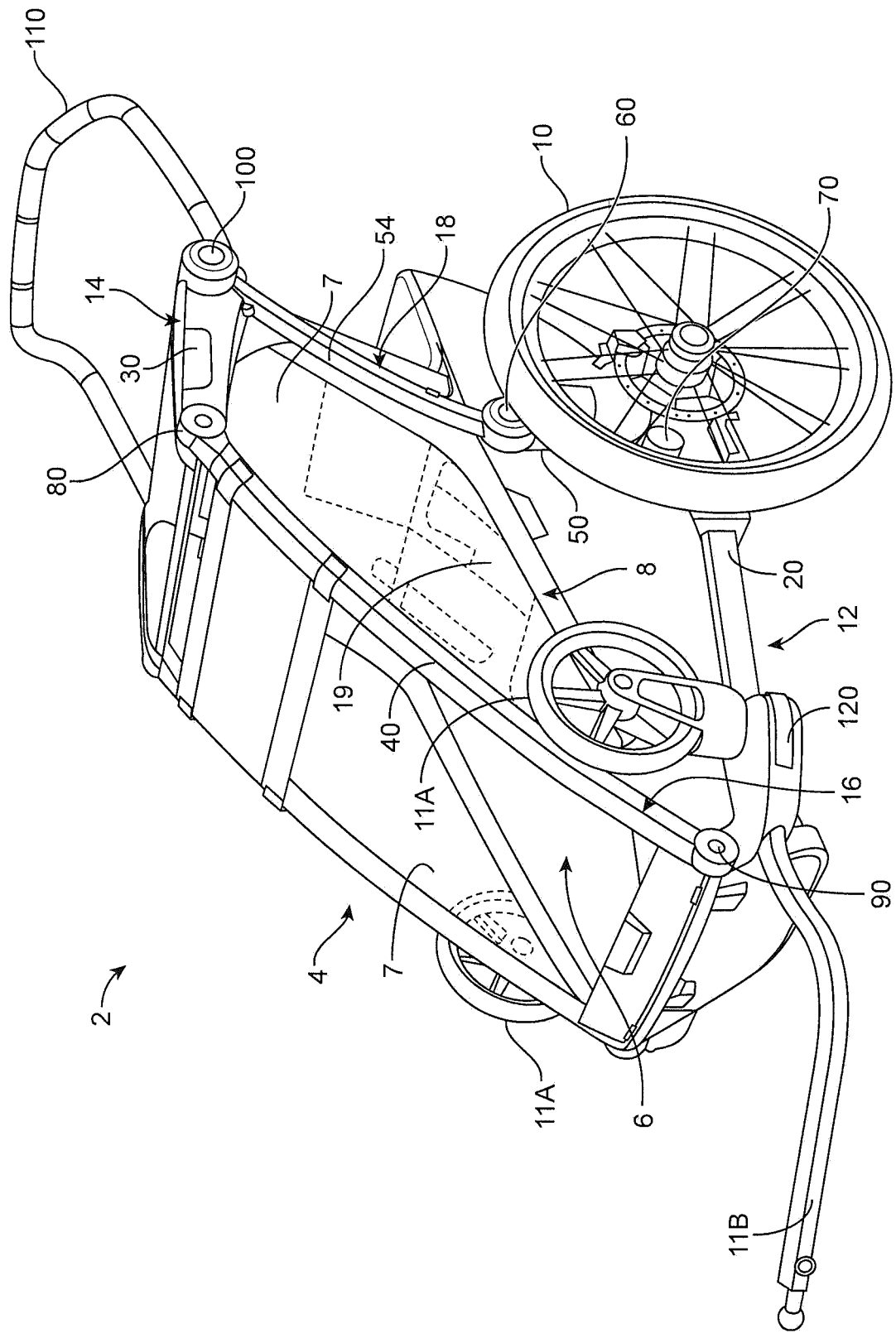
FIG. 1 illustrates a front perspective view of a passenger transport carrier, according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Figure 2:
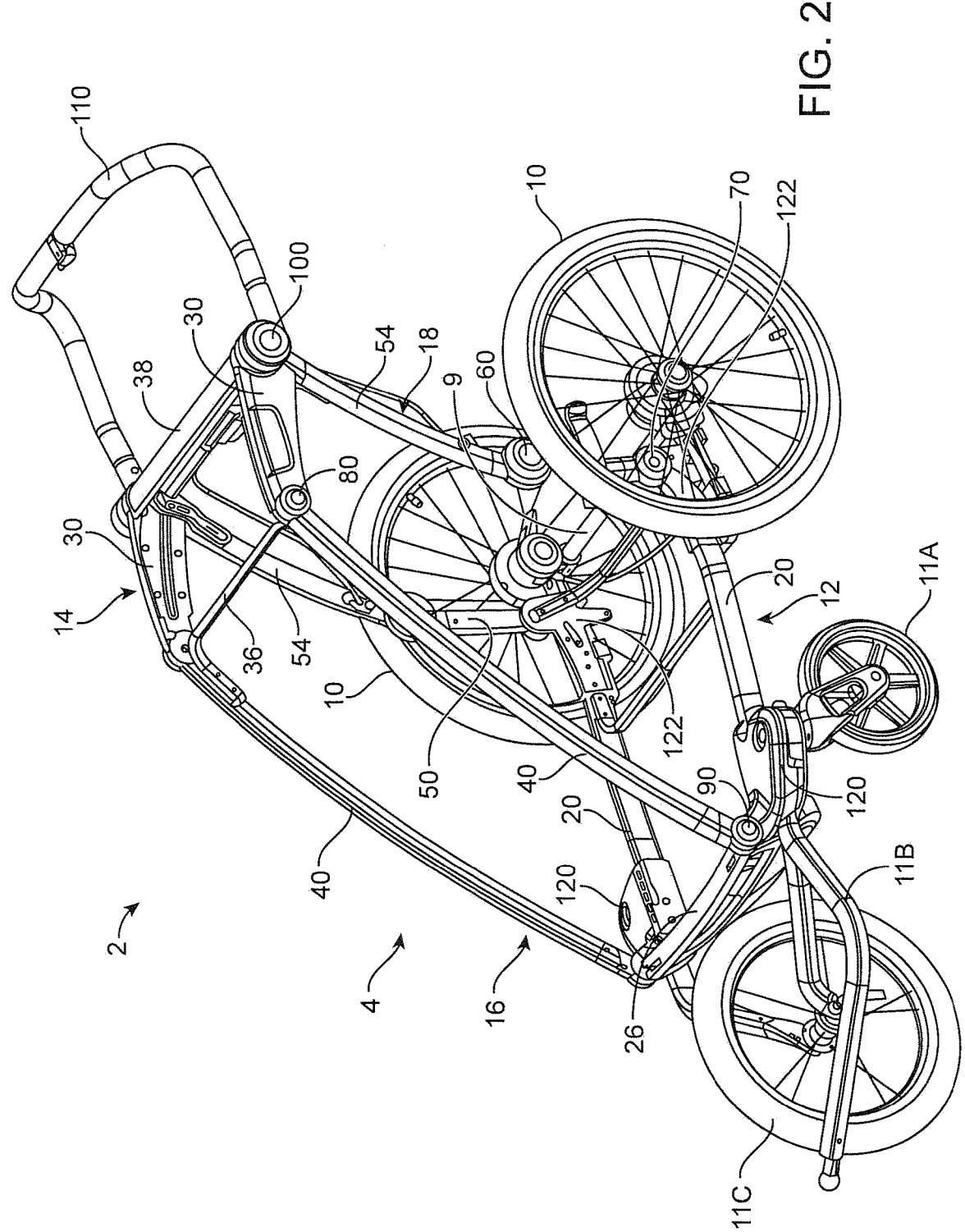
FIG. 2 illustrates a front perspective view of a passenger transport carrier, according to an embodiment.
Figure 3:
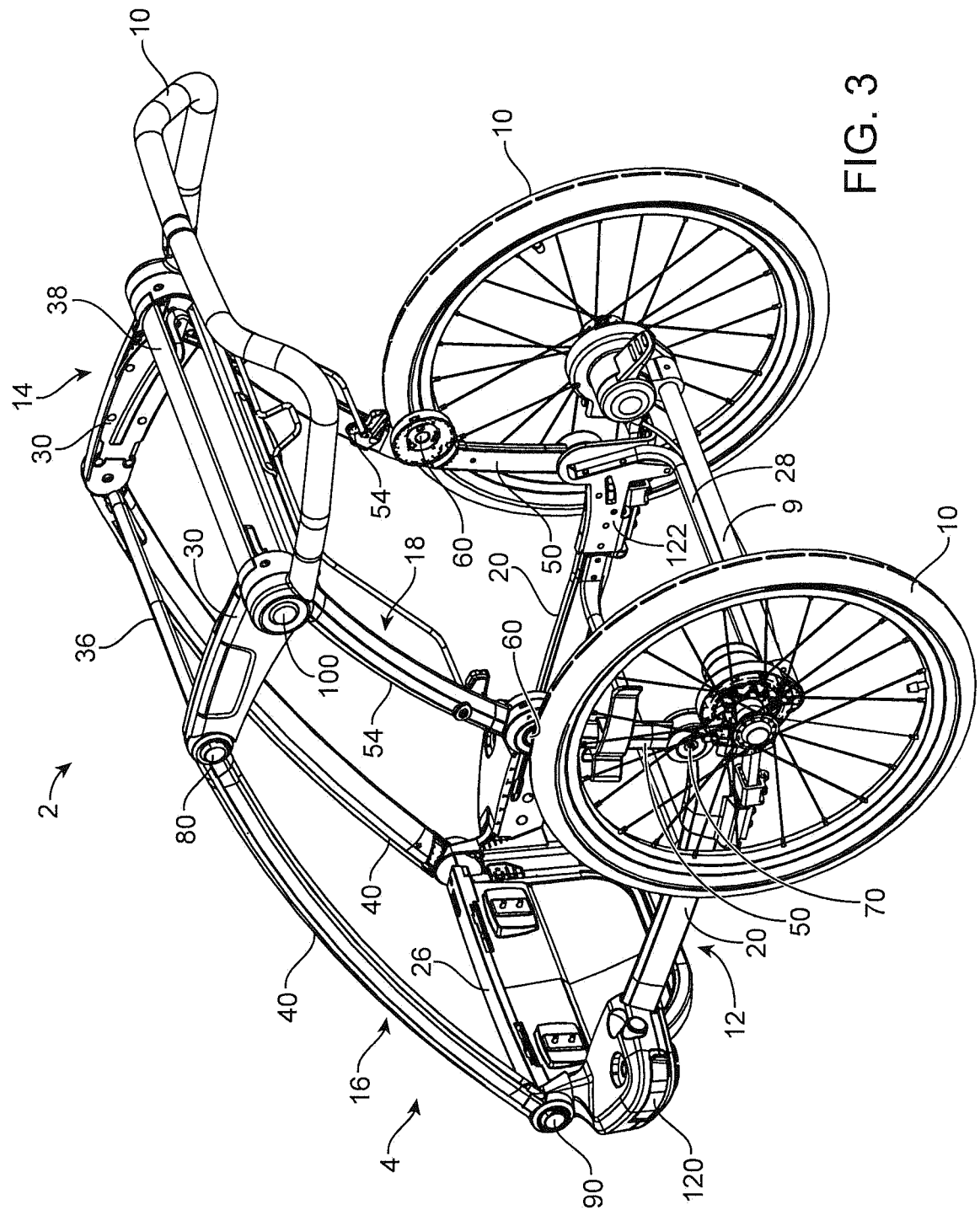
FIG. 3 illustrates a rear perspective view of a passenger transport carrier, according to an embodiment.

FIGS. 1-3 illustrate a passenger transport carrier 2 according to embodiments. Passenger transport carrier 2 is a device configured to carry a passenger from one place to another. The passenger can be, for example, a child, a disabled person, or an elderly person. FIG. 1 illustrates carrier 2 with a cover 8 and FIGS. 2 and 3 illustrate carrier 2 without cover 8 to provide a better view of frame assembly 4.

Carrier 2 can include a frame assembly 4 that defines a passenger compartment 6 configured to at least partially enclose a passenger. Carrier 2 can also include one or more transportation devices, for example, wheels 10, skis (not shown), or any other suitable transportation devices. Carrier 2 can be configured to transport at least one passenger, for example, one, two, or three passengers. Carrier 2 can be configured to fold between an expanded in-use position (e.g., FIG. 2) that facilitates normal operation of carrier 2 and a compact storage position (e.g., FIG. 4) that facilitates easy storage and manual hauling of carrier 2.

Carrier 2 can be configured either for a single mode of operation (for example, a single-function carrier such as a stroller) or for multiple modes of operations (for example, a multi-function carrier). For example, a single-function carrier can be configured for one of the following modes of operation: a bicycle mode in which the carrier is pulled by a bicycle; a ski mode in which the carrier is pulled by a skier; a walking mode in which the carrier is pushed by a user walking; a hiking mode in which the carrier is pulled by a user hiking; and a jogging mode in which the carrier is pushed by a jogging user. For example, a multi-function carrier can be configured to be used in at least two of the following modes: the bicycle mode; the ski mode; the walking mode; the hiking mode; and the jogging mode. In some multi-function embodiments, carrier 2 is configured such that the transportation devices, for example, wheels 10 or skis, can be selectively and releasably coupled to the carrier or placed in a non-use configuration. This configuration provides the user maximum flexibility by allowing the user to choose the desired mode. For example, FIG. 2 illustrates carrier 2 with a pair of rear wheels 10, a front wheel 11A, a bicycle hitch 11B, and a front jogging wheel 11C. Any or all of these transportation devices can be removably included on carrier 2.

Referring to FIG. 2, carrier 2 has a longitudinal axis L that is generally parallel to the intended direction of travel of the carrier, a transverse axis T that is generally perpendicular to longitudinal axis L, and a vertical axis V that is generally perpendicular to longitudinal axis L and transverse axis T. As described herein, longitudinal and longitudinally, transverse and transversely, and vertical and vertically are relative to longitudinal axis L, transverse axis T, and vertical axis V, respectively.

In some embodiments, carrier 2 is configured to transport one passenger. In some embodiments, carrier 2 is configured to transport a plurality of passengers. In some embodiments, carrier 2 is configured to transport a child. In some embodiments, carrier 2 is configured to transport an adult disabled person or an elderly person.

Carrier 2 includes a frame assembly 4 that provides structural support for carrier 2. Frame assembly 4 is configured to fold between an expanded in-use position that facilitates normal operation (i.e., travelling/transportation) of carrier 2 and a compact storage position that facilitates easy storage and manual hauling of carrier 2. To accommodate the folding action of frame assembly 4, frame assembly 4 can have a first joint assembly 60 that allows rear frame 18 to fold. In some embodiments, rear frame 18 can be locked to restrict folding of frame assembly 4. In some embodiments, first joint assembly 60 can be a locking hinge. Positioning first joint assembly 60 at the rear of frame assembly 4 can improve the aesthetics of carrier 2 because the first joint assembly 60 is easily hidden, for example, by the wheels 10 of the carrier 2. Positioning first joint assembly 60 at the rear of frame assembly 4 can make operation easier because it is close to the user's ordinary operating position and can be easily manipulated by the user to initiate folding of carrier 2, for example, by unlocking first joint assembly 60.

When transitioning the carrier 2 from the expanded in-use position to the compact storage position, portions of frame assembly 4 move and change positions relative to each other. This can be problematic when components of carrier 2, for example, a cover 8 or seat back 19 (see FIG. 1), that span these moving portions do not stretch or have limited ability to stretch. Accordingly, in some embodiments, frame assembly 4 and the first joint assembly 60 (positioned at the rear of frame assembly 4) are configured such that the relative movement of portions of frame assembly 4 is provided in such a way so as to permit movement within the confines of, for example, the cover 8. The relative position and movement of the various frame members and joint assemblies can facilitate folding of frame assembly 4 within the confines of cover 8 and also provide a reduced folded size of the carrier 2, which is advantageous for storage and carrying the carrier 2.

Frame assembly 4 defines compartment 6 for containing a passenger. In some embodiments, for example, as shown in FIGS. 1-3, frame assembly 4 completely surrounds compartment 6. This can provide additional protection to a passenger seated within compartment 6, which can be advantageous for carriers configured for ski mode, bicycle mode, hiking mode, and jogging mode. In some embodiments (not shown), frame assembly 4 partially surrounds compartment 6 leaving, for example, the front, sides, and/or top of compartment 6 open.

Referring to FIG. 1, in some embodiments, carrier 2 can include a cover 8 coupled to frame assembly 4. Cover 8 shields a passenger that is in compartment 6 from environmental elements, for example, sun, wind, rain, noise, or any other environmental element. In some embodiments, cover 8 completely surrounds compartment 6 to form a substantially enclosed passenger compartment. Cover 8 can be made from any suitable material, for example, but not limited to fabrics (e.g., nylon or spandex), mesh, plastic, or any combination thereof. In some embodiments, cover 8 can include one or more windows 7, for example, in the front, sides, and/or rear of cover 8. Windows 7 can allow the passenger to see out of the compartment 6 and the user to see into compartment 6. In some embodiments, windows 7 can be plastic to protect, for example, from rain. In some embodiments, windows 7 can be mesh, to protect, for example, from debris or insects, yet allow for air circulation. In some embodiments (not shown), cover 8 partially surrounds compartment 6 leaving, for example, the front, sides, or top of compartment 6 open. In some embodiments, cover 8 can be omitted. FIG. 2 shows carrier 2 without cover 8.

Carrier 2 includes at least one transportation device. For example, as shown in FIGS. 1-3, carrier 2 can include a plurality of wheels 10, for example, two, three, four, or more than four wheels. In some embodiments, carrier 2 can include two rear wheels 10, one on each side of carrier 2. In some embodiments, carrier 2 can include non-wheel transportation devices, for example, skis or any other suitable transportation device. In some embodiments, carrier 2 can include removable and/or interchangeable transportation devices. For example, as shown in FIGS. 1 and 2, carrier 2 can include one or more of a front wheel 11A, a bicycle hitch 11B, and a jogging wheel 11C. When a particular transportation device is not needed for use, it can be removed or put into a non-use position. For example, FIG. 1 illustrates front wheels 11A in a non-use position so that bicycle hitch 11B can be easily attached to a bicycle to pull carrier 2. In some embodiments, bicycle hitch 11B can be removed and front wheels 11A can be moved to a use position so that carrier 2 can be used as a stroller.

In some embodiments, referring collectively to FIGS. 1-8, frame assembly 4 can include a lower frame 12 that defines a lower boundary of passenger compartment 6; an upper frame 14 that defines an upper boundary of passenger compartment 6; a forward frame 16 that defines a forward boundary of passenger compartment 6; and a rear frame 18 that defines a rear boundary of passenger compartment 6. In some embodiments, one or more of lower frame 12, upper frame 14, forward frame 16, and rear frame 18 can be omitted such that the corresponding boundary of compartment 6 is open. For example, forward frame 16 can be omitted, in some embodiments, such that the front of compartment 6 is open. Although as illustrated in FIGS. 1-8, lower frame 12, upper frame 14, forward frame 16, and rear frame 18 are discrete portions of frame assembly 4, two or more of lower frame 12, upper frame 14, forward frame 16, and rear frame 18 can be continuous, integral portions that define multiple boundaries of passenger compartment 6. For example, in some embodiments, upper frame 14 and rear frame 18 or a portion of rear frame 18 (e.g., upper rear frame 54) can be integral. In some embodiments, a frame member forming a portion of lower frame 12, upper frame 14, forward frame 16, or rear frame 18 can be the same member forming a portion of the other frames. For example, upper frame member 30 and upper rear frame member 54 can be formed by the same frame member.

Referring to FIG. 1, carrier 2 can include a seat 19 configured to support a passenger within compartment 6. In some embodiments, the seat 19 can extend from lower frame 12 to upper frame 14. In some embodiments, seat 19 can extend along rear frame 18. In some embodiments, an upper end of seat back 19 can be coupled to upper frame 14 and a lower end of seat back 19 can be coupled to lower frame 12.

Lower frame 12 includes one or more lower frame members 20, made of any suitable material, for example, metal, plastic, and composite. In some embodiments, lower frame 12 can include at least two spaced apart elongate lower frame members 20. As shown, for example in FIG. 2, from the perspective facing the forward direction of travel for carrier 2, lower frame 12 can have a left lower frame member 20 on a left side of lower frame 12 and frame assembly 4 and a right lower frame member 20 on the right side of lower frame 12 and frame assembly 4. In some embodiments, the left and right sides can be mirror images of one another.

Lower frame members 20 extend longitudinally along frame assembly 4 and, in some embodiments, are parallel to longitudinal axis L. In some embodiments, lower frame members 20 can be parallel to each other. In some embodiments, lower frame members 20 can be curved. Lower frame members 20 have a forward end 22 and a rear end 24. In some embodiments, lower frame 12 can include a forward transverse frame member 26 that extends transversely across lower frame 12 and is coupled to forward ends 22 of longitudinal lower frame members 20. As best seen in FIG. 3, in some embodiments, lower frame 12 can include rear transverse frame member 28 that extends transversely across lower frame 12 and is fixedly coupled to rear ends 24 of longitudinal lower frame members 20. In some embodiments, lower frame 12 is rectangular when viewed from above in the vertical direction. In other embodiments, lower frame 12 has a non-rectangular shape, for example, a trapezoid, when viewed from above in the vertical direction.

Upper frame 14 is positioned above lower frame 12 in the vertical direction. Upper frame 14 includes one or more upper frame members 30 made of any suitable material, for example, metal, plastic, and composite. In some embodiments, upper frame 14 can include at least two transversely spaced apart elongate upper frame members 30. For example, as best seen in FIG. 2, upper frame 14 can include a left upper frame member 30 on a left side of upper frame 14 and frame assembly 4 and a right upper frame member 30 on the right side of upper frame 14 and frame assembly 4. Upper frame members 30 extend longitudinally along upper frame 14 and, in some embodiments, are parallel to longitudinal axis L. Upper frame members 30 have a forward end 32 and a rear end 34. As best seen in FIGS. 2 and 3, upper frame 14 can include a forward transverse frame member 36 that extends transversely across upper frame 14 and is coupled to forward ends 32 of longitudinal upper frame members 30. In some embodiments, upper frame 14 can include rear transverse frame member 38 that extends transversely across upper frame 14 and is coupled to rear ends 34 of longitudinal upper frame members 30. In some embodiments, upper frame 14 is rectangular when viewed from above in the vertical direction. In other embodiments, upper frame 14 has a non-rectangular shape, for example, a trapezoid, when viewed from above in the vertical direction. In some embodiments, upper frame members 30 have a shorter longitudinal length than lower frame members 20. In some embodiments, upper frame member 30 can be less than half the longitudinal length of lower frame member 20.

In some embodiments, at least a portion of upper frame 14 overlaps lower frame 12.

For example, forward ends 32 of upper frame members 30 of upper frame 14 can be positioned in front of rear ends 24 of lower frame members 20 of lower frame 12. Accordingly, when a passenger is in compartment 6, at least a portion of the passenger can be vertically between upper frame 14 and lower frame 12.

Figure 5:
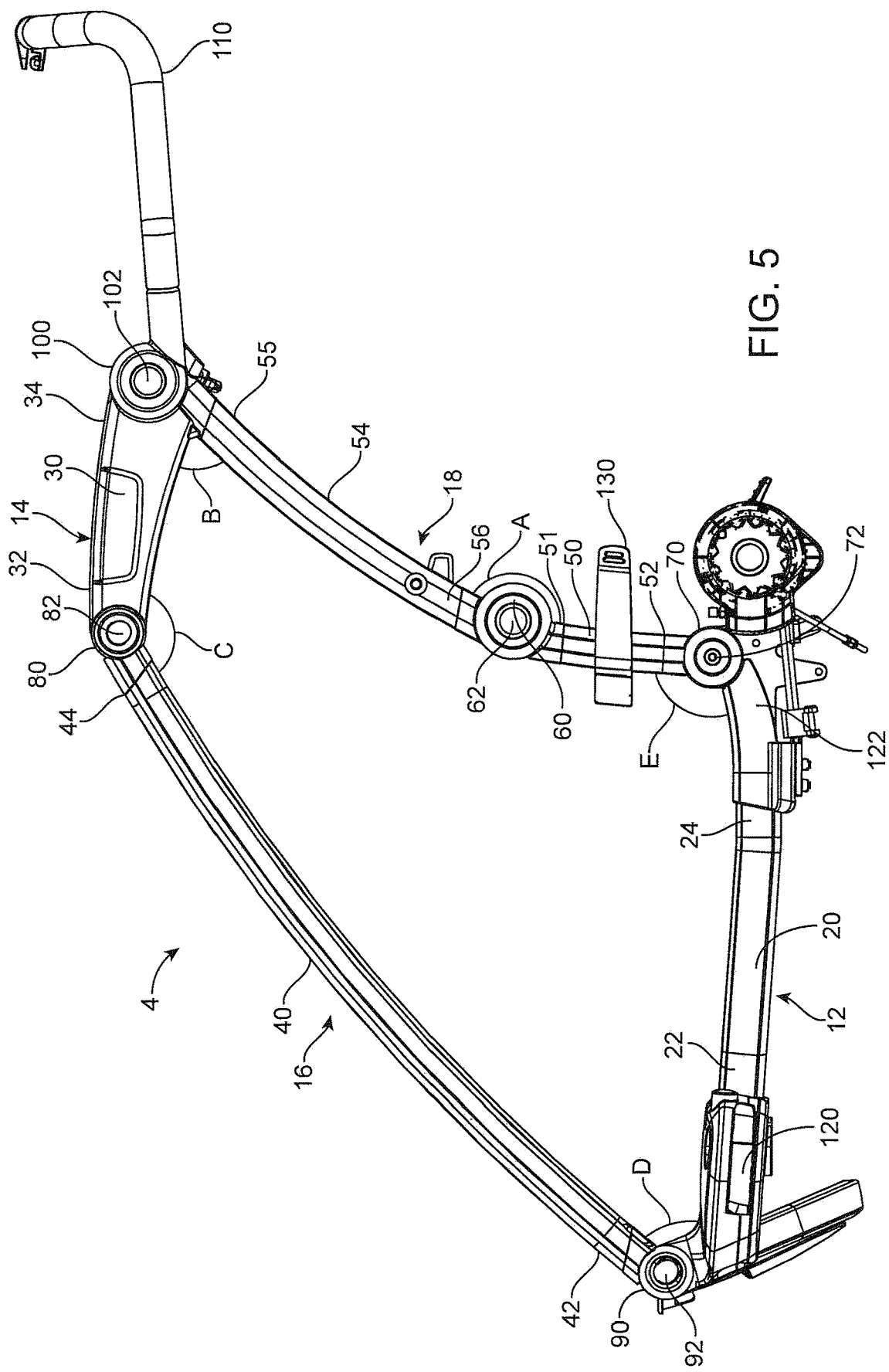
FIG. 5 illustrates a side view of a frame assembly in an unfolded in-use position, according to an embodiment.

Forward frame 16 extends between lower frame 12 and upper frame 14. Forward frame 16 includes one or more members made of any suitable material, for example, metal, plastic, and composite. In some embodiments, forward frame 16 can include at least two transversely spaced apart elongate forward frame members 40. For example, as shown in FIG. 2, forward frame 16 can include a left forward frame member 40 on a left side of forward frame 16 and frame assembly 4, and a right forward frame member 40 on the right side of forward frame 16 and frame assembly 4. Forward frame members 40 extend in the vertical and longitudinal direction from lower frame 12 to upper frame 14 and, in some embodiments (not shown), are parallel to vertical axis V. In some embodiments, for example as shown in FIG. 5, forward frame members 40 can be arcuate when viewed from the side. In some embodiments (not shown), forward frame members 40 can be straight.

Forward frame members 40 have a lower end 42 and an upper end 44. Lower ends 42 of forward frame members 40 are coupled to forward ends 22 of lower frame members 20, for example, at fourth joint assembly 90. In some embodiments, lower ends 42 of forward frame members 40 are rotatably coupled to forward ends 22 of lower frame members 20 of lower frame 12 at fourth joint assembly 90. In some embodiments, forward frame members 40 can be coupled to lower frame members 20 via hubs 120. For example, lower ends 42 of forward frame members 40 and forward ends 22 of lower frame members 20 can be disposed into respective holes of hubs 120. In some embodiments, fourth joint assembly 90 can be a part of hub 120.

Upper ends 44 of forward frame members 40 are coupled to forward ends 32 of upper frame members 30, for example, at third joint assembly 80. In some embodiments, upper ends 44 of forward frame members 40 are rotatably coupled to forward ends 32 of upper frame members 30 of upper frame 14. In some embodiments, third joint assembly 80 can be a non-locking joint.

Rear frame 18 extends between lower frame 12 and upper frame 14. Rear frame 18 includes one or more frame members made of any suitable material, for example, metal, plastic, and composite. In some embodiments, rear frame 18 includes at least two transversely spaced apart lower rear frame members 50 and at least two transversely spaced apart upper rear frame members 54. For example, as shown in FIGS. 2 and 3, rear frame 18 can include left and right lower rear frame members 50 and left and right upper rear frame member 54 on respective left and right sides of rear frame 18 and frame assembly 4. Lower rear frame members 50 and upper rear frame members 54 extend generally in the vertical direction from lower frame 12 to upper frame 14 and, in some embodiments (not shown), are parallel to vertical axis V.

Lower rear frame members 50 have a lower end 52 and an upper end 51. In some embodiments, lower ends 48 of lower rear frame members are rotatably coupled to rear ends 24 of lower frame members 20 of lower frame 12. In some embodiments, lower rear frame member 50 can be coupled to lower frame member 20 via hub 122. In some embodiments, lower rear frame member 50 can be coupled to lower frame member 20 via second joint assembly 70.

Upper rear frame members 54 each have a lower end 56 and an upper end 55. In some embodiments, upper ends 56 of upper rear frame members 54 are fixedly coupled to rear ends 34 of upper frame members 30 of upper frame 14. In some embodiments, upper rear frame member 54 can be coupled to upper frame member 30 at fifth joint assembly 100. In some embodiments, lower end 55 of upper rear frame member 54 is coupled to upper end 51 of lower rear frame 50, for example, at first joint assembly 60. In some embodiments, lower end 55 of upper rear frame member 54 is rotatably or hingedly coupled to upper end 51 of lower rear frame 50. In some embodiments, first joint assembly 60 is a locking joint such that lower rear frame member 50 and upper rear frame member 54 are fixed with respect to each other when first joint assembly 60 is locked. In some embodiments, when first joint assembly 60 is unlocked, for example, by pressing a button to disengage a lock of the locking joint, rear frame 18 is permitted to fold at first joint assembly 60 to allow frame assembly 4 of carrier 2 to transition from an expanded in-use position to a folded storage position.

Figure 4:
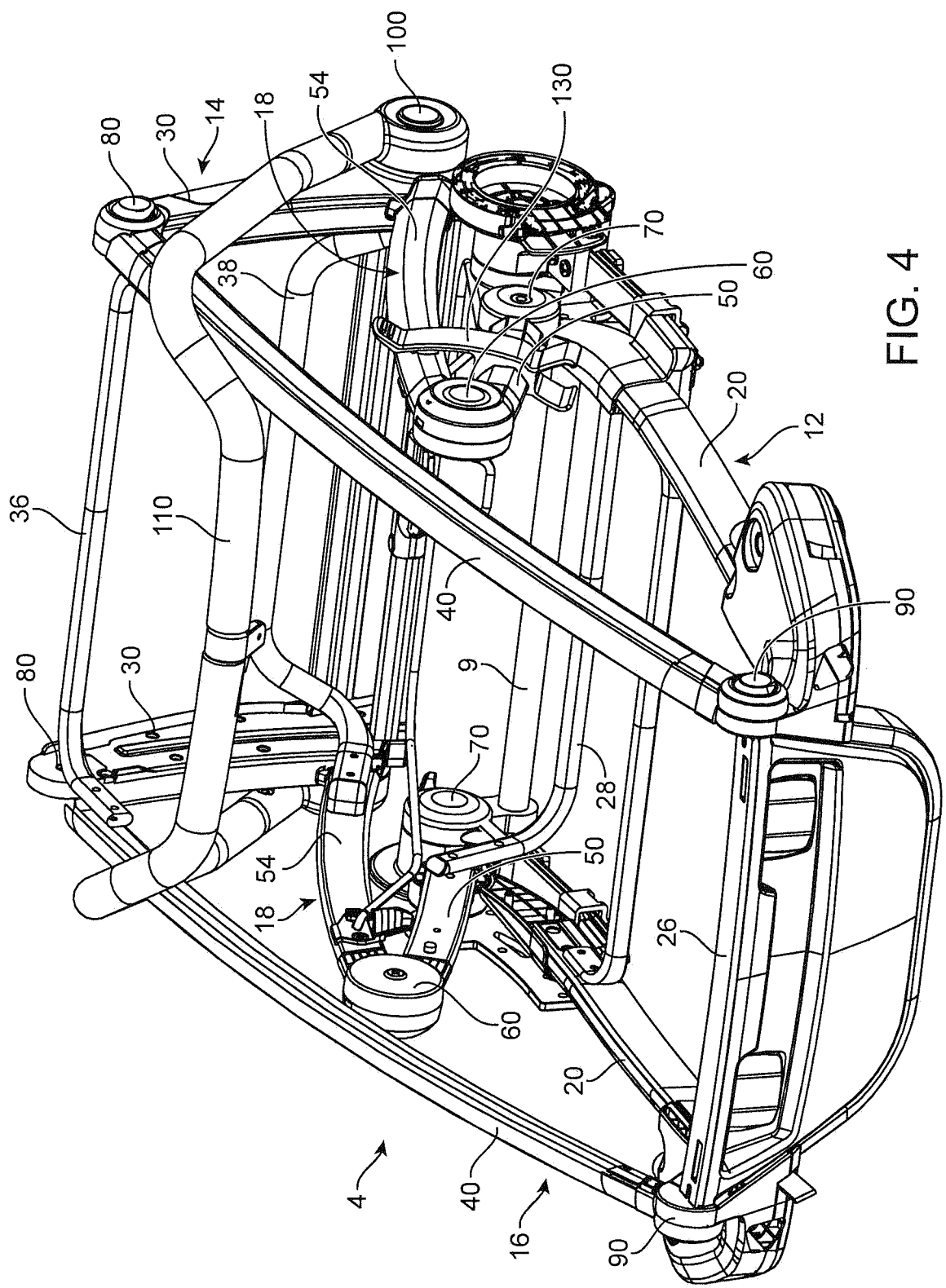
FIG. 4 illustrates a front perspective view of a folded frame assembly, according to an embodiment.
Figure 7:
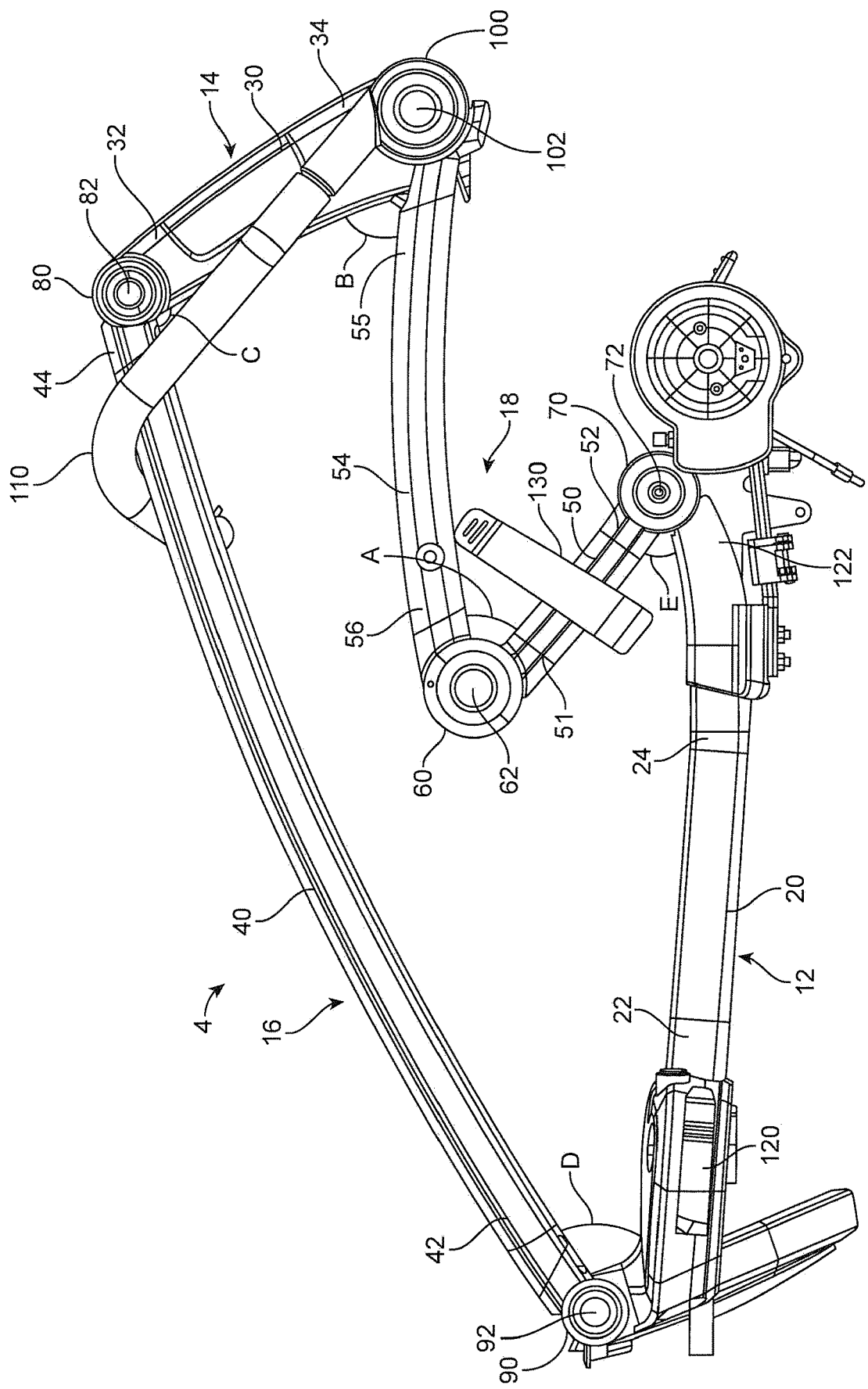
FIG. 7 illustrates a side view of a frame assembly in a partially folded position, according to an embodiment.
Figure 8:
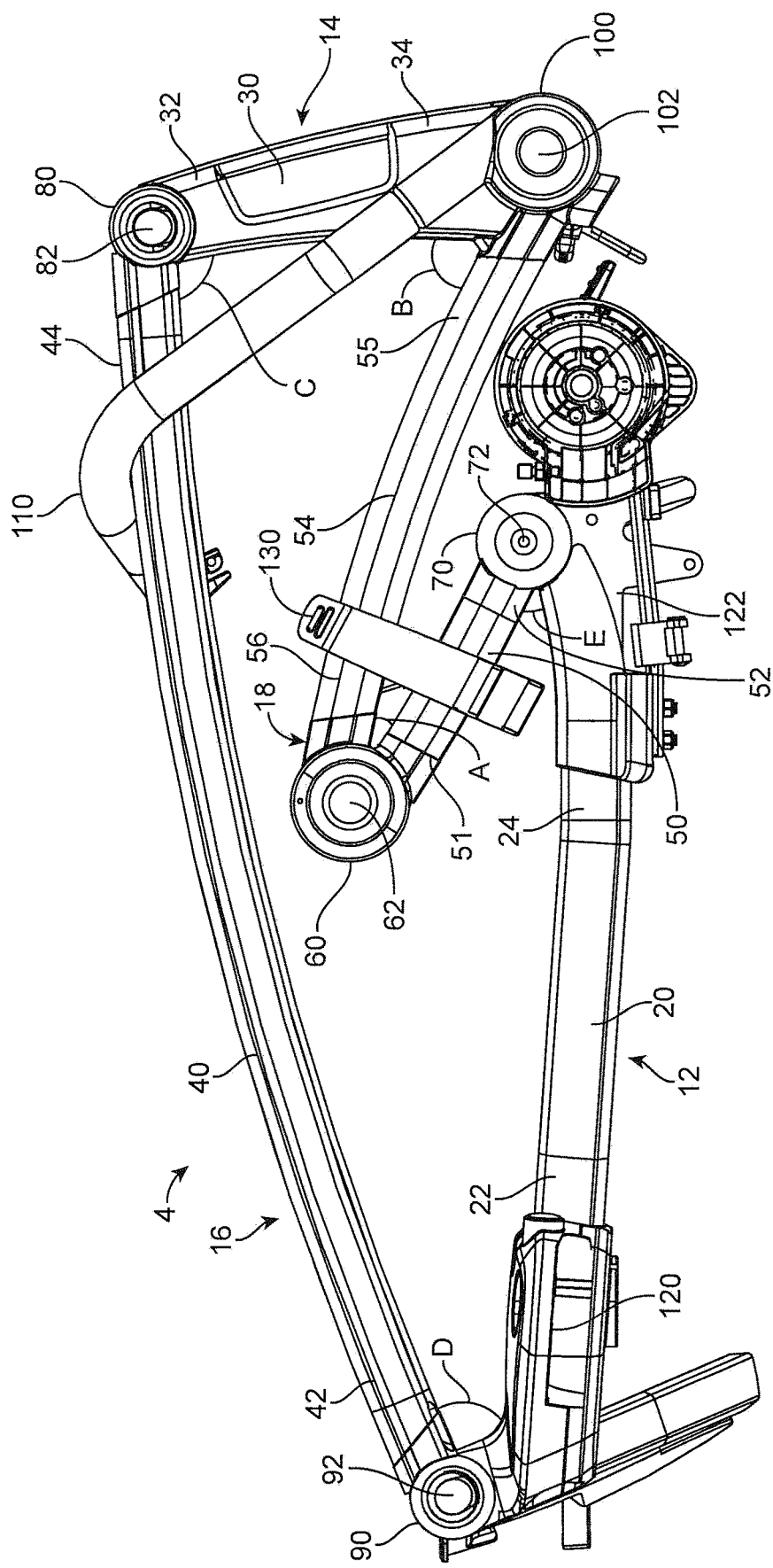
FIG. 8 illustrates a side view of a frame assembly in a folded storage position, according to an embodiment.

In some embodiments, frame assembly 4 is configured to fold between an expanded in-use position as shown, for example in FIGS. 1-3, to a folded storage position as shown, for example in FIGS. 4 and 8. FIGS. 5-8 illustrate frame assembly 4 transitioning from an in-use position to a folded storage position, according to an embodiment. In the in-use position, frame assembly 4 is configured to be used, for example, in the bicycle mode, the ski mode, the walking mode, the hiking mode, or the jogging mode. In the folded storage position, frame assembly 4 has a reduced size that is easy to store and manually haul.

FIGS. 5-8 illustrate side views of frame assembly 4 with the wheels 10 and cover 8 removed to show the relative positions of frame members, joint assemblies, and angles between frame members as frame assembly 4 transitions from an expanded in-use position (FIG. 5) to a folded storage position (FIG. 8), according to an embodiment. The relative positioning and movement of upper frame 14 and rear frame 18 and their associated joint assemblies 60, 70, 80, and 100 are of particular importance in maintaining the shape, fit, and aesthetic of cover 8 as carrier 2 transition between the in-use and folded positions. The relationship between these components minimizes the risk of snagging, pinching, creasing, and tearing of the material of cover 8. It also can reduce the overall size of the folded frame assembly 4, thereby making storage and manual hauling easier.

To aid in the description of the embodiments, connections between frame members are indicated as joint assemblies 60, 70, 80, 90, and 100. The description of a joint assembly as fixed, hinged, rotatable, pivoting, etc. is not meant to be limiting to the type of connection between frame members at that joint assembly and one of skill in the art would understand that other types of connections between frame members can be used. Generally, an end of one frame member is coupled to the end of another frame member at a joint assembly. For example, at first joint assembly 60, lower end 56 of upper rear frame member 54 is coupled to upper end 51 of lower rear frame member 50. In some embodiments, frame members may be directly coupled to one another. In some embodiments, a hub can facilitate connection between frame members. For example, as shown in FIG. 5, forward end 22 of lower frame member 20 can be disposed in hub 120, which can include or be coupled with fourth joint assembly 90 to which lower end 42 of forward frame member 40 is connected.

Joint assemblies 60, 70, 80, 90, and 100 can have respective center points 62, 72, 82, 92, and 102. Where frame members are rotatable with respect to each other, center points 62, 72, 82, 92, and 102 can designate a point about which the frame member(s) rotate. In some embodiments, center points 62, 72, 82, 92, and 102 can represent a transverse axis through the respective joint assembly. In some embodiments, frame member can rotate about these axes. When a relative position of a joint assembly is described, the position is defined by the position of the center point of that joint assembly. For example, where first joint assembly 60 is described as longitudinally rearward of third joint assembly 80, the position of center point 62 of first joint assembly 60 is rearward of center point 82 of third joint assembly 80 in the longitudinal direction of carrier 2.

The frame members form angles between adjacent connected frame members, for example, angles A, B, C, D, and E shown in FIG. 5. In some embodiments, angles A-E can increase or decrease as frame assembly 4 transitions from the in-use position to the folded storage position. As described herein, angle measurements are defined as the angle between lines through adjacent center points of joint assemblies. For example, at third joint assembly 80 connecting upper frame member 30 and forward frame member 40, interior angle C between upper frame member 30 and forward frame member 40 is defined as the angle formed between a line through center point 92 and center point 82 and a line through center point 102 and center point 82. This accounts for different sizes, shapes, and curvatures of frame members and joint assemblies.

FIG. 5 illustrates frame assembly 4 in an in-use position, according to an embodiment. In some embodiments, rear frame 18 can form an exterior angle A between upper rear frame member 54 and lower rear frame member 50. In some embodiments, exterior angle A can be less than 180 degrees. In some embodiments, exterior angle A can be less than 175 degrees. In some embodiments, exterior angle A can be less than 165 degrees. Exterior angle A can be formed, for example, by having a separate upper rear frame member 54 and lower rear frame member 50 coupled at first joint assembly 60, rather than a single rear frame member connecting upper frame 14 and lower frame 12. This geometry can reduce over-tensioning, pinching, etc. of cover 8 as carrier 2 transitions from the in-use to folded positions. Exterior angle A can be formed at less than 180 degrees, for example, by disposing first joint assembly 60 of rear frame 18 longitudinally forward of fifth joint assembly 100 and disposing second joint assembly 70 longitudinally rearward of a line through center point 62 of first joint assembly 60 and center point 102 of fifth joint assembly 100. In some embodiments, first joint assembly 60 can be disposed rearward of third joint assembly 80, forward of fifth joint assembly 100, and rearward of second joint assembly 70 in the in-use position. In some embodiments, first joint assembly 60 can be disposed directly above second joint assembly 70 in the vertical direction. In some embodiments, first joint assembly 60 can be disposed rearward of a line between second joint assembly 70 and third joint assembly 80.

In some embodiments, first joint assembly 60 can be a locking joint, where first joint assembly 60 is locked in the in-use position. This can prevent upper rear frame member 54 and lower rear frame member 50 from moving with respect to one another when carrier 2 is being used. In some embodiments, when first joint assembly 60 is unlocked, for example, by activating a button, pin, lever, etc., rear frame 18 can be folded. In some embodiments, first joint assembly 60 can provide a hinged connection between upper rear frame member 54 and lower rear frame member 50 such that one or both of upper rear frame member 54 and lower rear frame member 50 can rotate with respect to center point 62 of first joint assembly 60.

Figure 6:
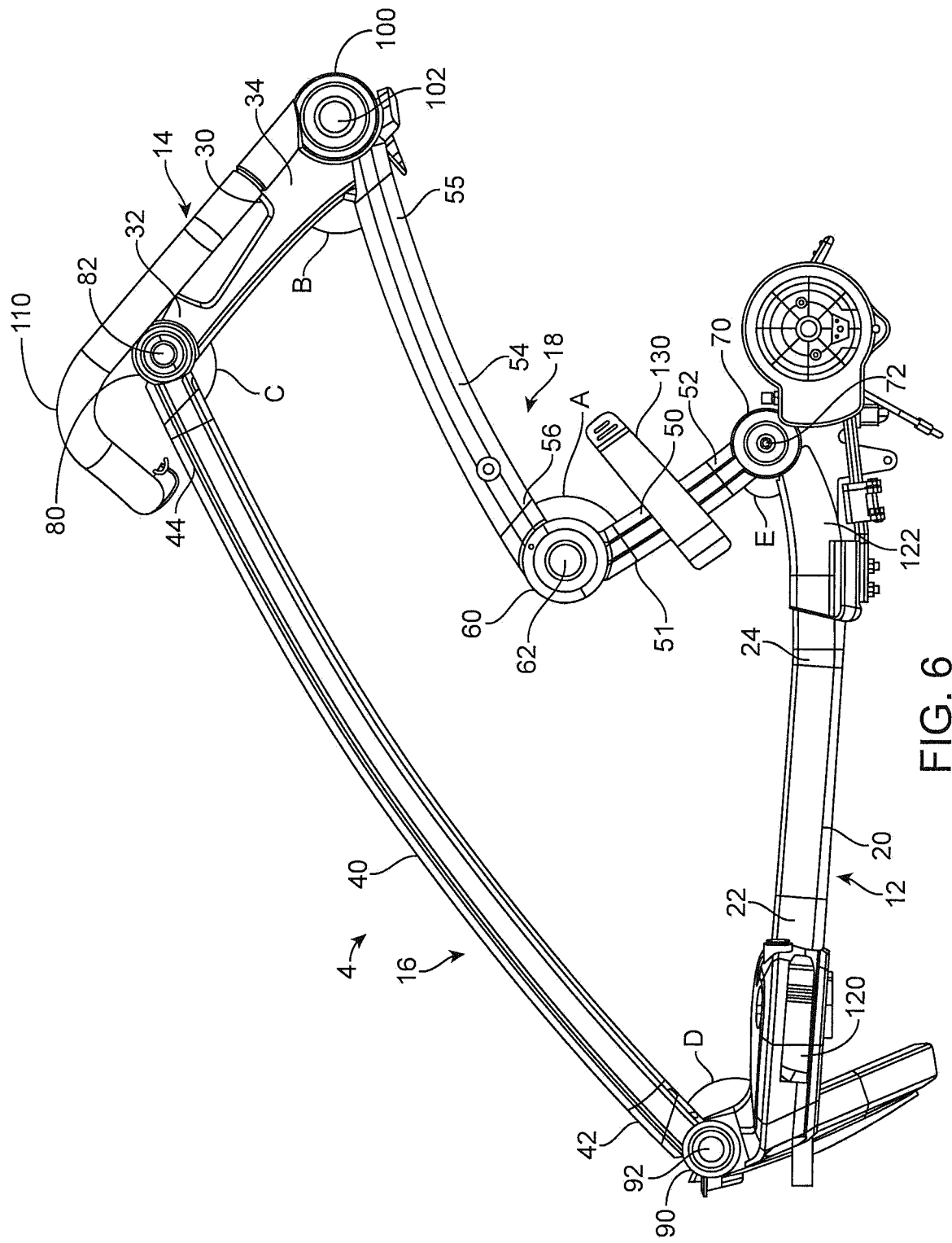
FIG. 6 illustrates a side view of a frame assembly in a partially folded position, according, to an embodiment.

In some embodiments, as shown for example in FIGS. 6-8, as rear frame 18 is folded, first joint assembly 60 can move longitudinally forward. In some embodiments, first joint assembly 60 can be disposed forward of second joint assembly 70 and/or third joint assembly 80 in the folded position. In some embodiments, longitudinal movement of first joint assembly is provided because lower rear frame member 50 is rotatable at second joint assembly 70. Thus, upper end 51 of lower rear frame member 50 can rotate forward with respect to center point 72, allowing first joint assembly 60 to move longitudinally forward.

Furthermore, as rear frame 18 is folded, exterior angle A between upper rear frame member 54 and lower rear frame member 50 can decrease. For example, as joint assembly 60 moves longitudinally forward, upper rear frame member 54 and lower rear frame member 50 can fold such that they are closer to each other and closer to lower frame member 20. In some embodiments, exterior angle A can be less than 90 degrees in the folded storage position. In some embodiments, exterior angle A can be less than 45 degrees in the folded storage position. In some embodiments, exterior angle A can be less than 20 degrees in the folded storage position.

In some embodiments, upper frame member 30 can be fixed relative to upper rear frame member 54. In such embodiments, neither upper frame member 30 nor upper rear frame member 54 rotate about center point 102 of fifth joint assembly 100. However, in some embodiments, handle 110 can still rotate about center point 102 of fifth joint assembly 100, as shown in FIGS. 6-8, where handle 110 can be rotated forward until it contacts forward frame member 40, minimizing the size of frame assembly 4 in the folded storage position. When upper frame member 30 and upper rear frame member 54 are fixed relative to each other, interior angle B is also fixed, including during the transition from the in-use position to the folded storage position. In some embodiments, interior angle B can be less than 90 degrees. In some embodiments, interior angle B can be less than 75 degrees.

In some embodiments, the shape of upper frame member 30 and upper rear frame member 54 can resemble the number seven (7). This can be due the relative positioning of joint assemblies 60, 80, and 100. As shown for example in FIG. 5, third joint assembly 80 and fifth joint assembly 100 can be disposed at approximately the same vertical position, with third joint assembly 80 disposed forward of fifth joint assembly 100. First joint assembly 60 can be disposed vertically below and longitudinally between third joint assembly 80 and fifth joint assembly 100, thus forming the "7" shape. This shape can help minimize the risk of snagging, pinching, creasing, and tearing of the material of cover 8 and reduce the overall size of the frame assembly 4 in both the in-use and folded storage positions.

In some embodiments, interior angle C between forward frame member 40 and upper frame member 30 can be greater than 90 degrees when the carrier 2 is in the in-use position, as shown for example in FIG. 5. In some embodiments, interior angle C can be greater than 135 degrees in the in-use position. In some embodiments, third joint assembly 80 can be a non-locking joint. When rear frame 18 is folded, upper frame member 30 can rotate about center point 82 of third joint assembly 80. When upper frame member 30 and upper rear frame member 54 are fixed relative to each other, upper frame member 30 and upper rear frame member 54 can simultaneously rotate about third joint assembly 80. As rear frame 18 is folded, interior angle C can decrease. In some embodiments, interior angle C can be between 80 and 110 degrees when carrier 2 is in the folded position. In some embodiments, interior angle C can be about 90 degrees when carrier 2 is in the folded position, as shown for example in FIG. 8. Having upper frame member 30 rotate about third joint assembly 80 when rear frame 18 is folded can reduce the folded length of carrier 2 in the longitudinal direction. When upper frame member 30 and upper rear frame member 54 are fixedly coupled, this rotation can also facilitate tucking upper rear frame member 54 under forward frame member 40 in the folded position, as shown for example in FIG. 8, which can also reduce the folded height of carrier 2 in the vertical direction. In some embodiments, a securement device 130, for example a strap or a clip, can coupled lower rear frame member 50 and upper rear frame member 54 in the folded position to maintain frame assembly 4 in the folded position.

In some embodiments, interior angle D between forward frame member 40 and lower frame member 20 can be less than 90 degrees when the carrier 2 is in the in-use position, as shown for example in FIG. 5. In some embodiments, interior angle D can be less than 75 degrees in the in-use position. In some embodiments, fourth joint assembly 90 can be a non-locking joint. In some embodiments, when rear frame 18 is folded, forward frame member 40 can rotate about center point 92 of fourth joint assembly 90. In some embodiments, fourth joint assembly 90 can be a hinge joint. As rear frame 18 is folded, interior angle D can decrease. In some embodiments, interior angle D can be less than 45 degrees when carrier 2 is in the folded position. In some embodiments, interior angle D can be less than 25 degrees when carrier 2 is in the folded position. In some embodiments, fourth joint assembly 90 can be part of a hub 120, which can connect forward frame member 40 and lower frame member 20.

In some embodiments, interior angle E between lower frame member 20 and lower rear frame member 50 can be between 70 and 120 degrees when the carrier 2 is in the in-use position. In some embodiments, interior angle E can be greater than 90 degrees in the in-use position. In some embodiments, interior angle E can be about 95 degrees when the carrier 2 is in the in-use position, as shown for example in FIG. 5. In some embodiments, second joint assembly 70 can be a non-locking joint. When rear frame 18 is folded, lower rear frame member 50 can rotate about center point 72 of second joint assembly 70. As rear frame 18 is folded, interior angle E can decrease. In some embodiments, interior angle E can be less than 75 degrees when carrier 2 is in the folded position. In some embodiments, interior angle E can be less than 45 degrees when carrier 2 is in the folded position. In some embodiments, second joint assembly 70 can be part of hub 122, which can connect lower frame member 20 and lower rear frame member 50.

Methods of folding a carrier are also contemplated. The frame assembly can have any of the geometries described above. In some embodiments, a method of folding a child transport carrier can include unlocking a first joint assembly coupling a lower rear frame member and an upper rear frame member. In some embodiments, the first joint assembly can be disposed longitudinally forward of a rear end of an upper frame member, longitudinally rearward of a forward end of the upper frame member, and longitudinally rearward of a lower end of the lower rear frame member in an unfolded in-use position. In some embodiments, the upper frame member can be fixedly coupled to the upper rear frame member. In some embodiments, the method can include rotating the upper frame member and the upper rear frame member about a second joint assembly. In some embodiments, the method can include displacing the first joint assembly longitudinally forward such that the first joint assembly is disposed longitudinally forward of the forward end of the upper frame member in a folded storage position.

Methods of unfolding a carrier from a storage position to an in-use position are also contemplated. The carrier can be unfolded from any of the folded geometries described herein to any of the unfolded in-use geometries described herein.

It is to be appreciated that the Detailed Description section, and not the Brief Summary and Abstract sections, is intended to be used to interpret the claims. The Summary and Abstract sections may set forth one or more but not all exemplary embodiments of passenger transport carriers, frame assemblies, and joint assemblies as contemplated by the inventors, and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A child transport carrier, comprising:
   an upper frame member having a forward end and a rear end; and
   a rear frame coupled to the upper frame member, the rear frame comprising:
      a lower rear frame member,
      an upper rear frame member having an upper end fixedly coupled to the rear end of the upper frame member, and
      a first joint assembly coupling the lower rear frame member and the upper rear frame member,
   wherein the rear frame is configured to fold between an unfolded in-use position and a folded storage position,
   wherein the upper frame member and the upper rear frame member are fixed from rotation relative to each other,
   wherein the first joint assembly is disposed longitudinally rearward of the forward end of the upper frame member and longitudinally forward of the rear end of the upper frame member in the unfolded in-use position, and
   wherein the forward end of the upper frame member is longitudinally forward of the rear end of the upper frame member along a forward direction of travel of the child transport carrier.

2. The carrier of claim 1, further comprising:
   a lower frame member having a forward end and a rear end, wherein the rear end of the lower frame member is coupled to a lower end of the lower rear frame member, and
   wherein the first joint assembly is disposed longitudinally rearward of the lower end of the lower rear frame member in the unfolded in-use position.

3. The carrier of claim 2, wherein the first joint assembly is configured to move toward the forward end of the lower frame member when transitioning from the unfolded in-use position to the folded storage position, such that the first joint assembly is disposed longitudinally forward of the forward end of the upper frame member in the folded storage position.

4. The carrier of claim 2, further comprising:
   a forward frame member having a lower end and an upper end,
   wherein the lower end of the forward frame member is coupled to the forward end of the lower frame member, and
   wherein the upper end of the forward frame member is coupled to the forward end of the upper frame member.

5. The carrier of claim 4, wherein the upper end of the forward frame member is disposed longitudinally rearward of the lower end of the lower rear frame member in the folded storage position.

6. The carrier of claim 4, wherein the upper end of the forward frame member and the forward end of the upper frame member are rotatably coupled at a second joint assembly.

7. The carrier of claim 1, wherein an interior angle between the upper frame member and the upper rear frame member is less than 70 degrees.

8. The carrier of claim 1, wherein a lower end of the upper rear frame member is disposed higher than the upper end of the upper rear frame member in the vertical direction in the folded storage position.

9. A child transport carrier, comprising:
   an upper frame member having a rear end; and
   a rear frame comprising an upper rear frame member having an upper end coupled to the rear end of the upper frame member,
   wherein the upper frame member and the upper rear frame member are fixed from rotation relative to each other,
   wherein the upper frame member and the upper rear frame member form an acute interior angle,
   wherein the rear frame is configured to fold between an unfolded in-use position and a folded storage position, and
   wherein a forward end of the upper frame member is longitudinally forward of the rear end of the upper frame member along a forward direction of travel of the child transport carrier.

10. The carrier of claim 9, wherein the acute interior angle between the upper frame member and the upper rear frame member is less than 70 degrees.

11. The carrier of claim 9, wherein the rear frame further comprises a lower rear frame member having an upper end coupled to a lower end of the upper rear frame member, wherein the upper rear frame member and the lower rear frame member form an obtuse exterior angle in the unfolded in-use position.

12. The carrier of claim 11, wherein the upper rear frame member and the lower rear frame member form an acute exterior angle in the folded storage position.

13. The carrier of claim 12, wherein the acute exterior angle between the upper rear frame member and the lower rear frame member in the folded storage position is less than 45 degrees.

14. A child transport carrier, comprising:
a frame assembly, comprising:
- a pair of transversely spaced upper frame members each having a rear end, wherein the upper frame members are coupled by a transverse frame member; and
- a rear frame comprising a pair of transversely spaced upper rear frame members each having an upper end coupled to respective rear ends of the upper frame members,
wherein the upper frame members and the upper rear frame members are fixed from rotation relative to each other and form acute interior angles,
wherein the rear frame is configured to fold between an unfolded in-use position and a folded storage position, and
wherein forward ends of the pair of transversely spaced upper frame members are longitudinally forward of the rear ends of the pair of transversely spaced upper frame members along a forward direction of travel of the child transport carrier.

15. The carrier of claim 14, wherein the frame assembly further comprises:
- a pair of transversely spaced lower rear frame members each having an upper end and a lower end; and
- a pair of transversely spaced lower frame members,
wherein the upper ends of the lower rear frame members are coupled to respective lower ends of the upper rear frame members, and
wherein the lower ends of the lower rear frame members are coupled to respective rear ends of the lower frame members.

16. The carrier of claim 15, further comprising a pair of transversely spaced wheels coupled to the frame assembly.

17. The carrier of claim 15, further comprising:
- a pair of forward frame members each having a lower end and upper end, wherein the lower ends are coupled to respective forward ends of the lower frame member, and wherein the upper ends are coupled to respective forward ends of the upper frame member; and
- a seat coupled to the frame assembly configured to carry one or more passengers, wherein the seat is disposed rearward of the forward frame members.

18. The carrier of claim 15, further comprising a front wheel disposed forward of and transversely between the lower frame members.

19. The carrier of claim 15, further comprising a bicycle hitch member coupled to the frame assembly.

* * * * *